March 2, 1965 F. M. WILLBRANDT Re. 25,736

POUCH AREA MARKING CONTROL FOR POUCH PACKAGING MACHINES

Original Filed March 9, 1961 3 Sheets-Sheet 1

INVENTOR.
Franklin M. Willbrandt
BY Otto A. Earl
ATTORNEY

March 2, 1965 F. M. WILLBRANDT Re. 25,736

POUCH AREA MARKING CONTROL FOR POUCH PACKAGING MACHINES

Original Filed March 9, 1961 3 Sheets-Sheet 2

INVENTOR.
Franklin M Willbrandt
BY
ATTORNEY

POUCH AREA MARKING CONTROL FOR POUCH PACKAGING MACHINES

Original Filed March 9, 1961 3 Sheets-Sheet 3

INVENTOR.
Franklin M Willbrandt
BY
ATTORNEY.

United States Patent Office

Re. 25,736
Reissued Mar. 2, 1965

25,736

POUCH AREA MARKING CONTROL FOR POUCH PACKAGING MACHINES

Franklin M. Willbrandt, Battle Creek, Mich., assignor to Battle Creek Packaging Machines, Incorporated, Battle Creek, Mich.

Original No. 3,075,328, dated Jan. 29, 1963, Ser. No. 94,578, Mar. 9, 1961. Application for reissue Sept. 2, 1964, Ser. No. 405,316
13 Claims. (Cl. 53—51)

Matter enclosed in heavy brackets [ ] appears in the original patent but forms no part of this reissue specification; matter printed in italics indicates the additions made by reissue.

This invention relates to improvements in [pouch area marking control for pouch packaging machines] *electrically adjusted pouch length marker.* The principal objects of this invention are:

First, to provide a pouch packaging machine of the type which receives articles to be packaged on a continuously advancing web of packaging material and thereafter encloses the articles in a pouch formed of the packaging material with means for marking the incoming web of material to indicate the article receiving areas and for quickly and accurately adjusting the marking means to define a variety of different pouch areas in registry with the pouch forming elements of the machine.

Second, to provide adjustable control means for regulating the frequency of actuation of the pouch type packaging machine and for separately actuating the adjustable pouch area marking device cooperative with the infeeding web of packaging material so that the length of the pouch formed by the machine can be easily adjusted along with the speed with which the pouches are formed.

Third, to provide a pouch type wrapping machine with means for adjusting the frequency of actuation of the pouch forming means relative to the frequency of a pouch area marking device and for further adjusting the position at which the pouch forming means will operate linearly with respect to the pouch area indicia marked on the web of wrapping material.

Fourth, to provide a continuous pouch type packaging machine which can easily and rapidly be adjusted to package a wide variety of different shapes and length of articles.

Other objects and advantages of the invention will be apparent from a consideration of the following description and claims. The drawings, of which there are three sheets, illustrate a highly practical form of the pouch length adjusting mechanism of a pouch type packaging machine.

Figure 8:
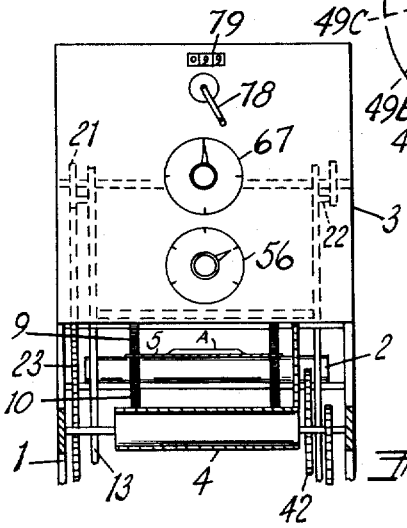
FIG. 8 is a fragmentary vertical cross sectional view through the off feeding conveyor of the packaging machine illustrating the adjusting controls and the pouch forming mechanism of the machine.

The pouch packaging machine so far as the pouch forming and sealing elements thereof are concerned, is of the type disclosed in the co-pending application, Serial No. 848,250 filed October 23, 1959, now Patent Number 2,996,860 for Pouch Area Marker and Pouch Packaging Machines. Only so much of the structure of the pouch forming mechanism will be described as is necessary to explain the relationship of the adjustable control mechanism relative thereto. As appears generally in FIGS. 1 and 8, the machine consists of suitable frame elements 1—1 supporting an infeeding conveyor 2 and a pouch forming, sealing and severing mechanism enclosed in the case 3. An off feeding conveyor 4 for the packaged articles delivers from the opposite side of the machine.

A continuous bottom web 5 of packaging material is drawn in from the supply roll 6 along the infeeding conveyor. The web 5 passes under an electrically actuated printing device 7 having a solenoid 8 arranged to imprint any desired indicia on the web at the infeeding end conveyor. It will be appreciated that by timing the actuation of the solenoid 8 relative to the rate of travel of the conveyor 2 and web 5 a series of packaging or pouch areas can be created on the web 5 and operators may place articles A to be packaged on the conveyor at the properly indicated areas on the web as the web is advanced to the pouch forming mechanism 3.

Within the pouch forming mechanism 3 there are provided pairs of upper side sealing rolls 9 and lower side sealing rolls 10 which are rotated in sealing and crimping engagement with the side edges of the infeeding web 5. In the example illustrated a top sealing web 11 is drawn inwardly from the supply roll 12 and sealed to the bottom web 5 over the articles placed on the bottom web.

Figure 1:
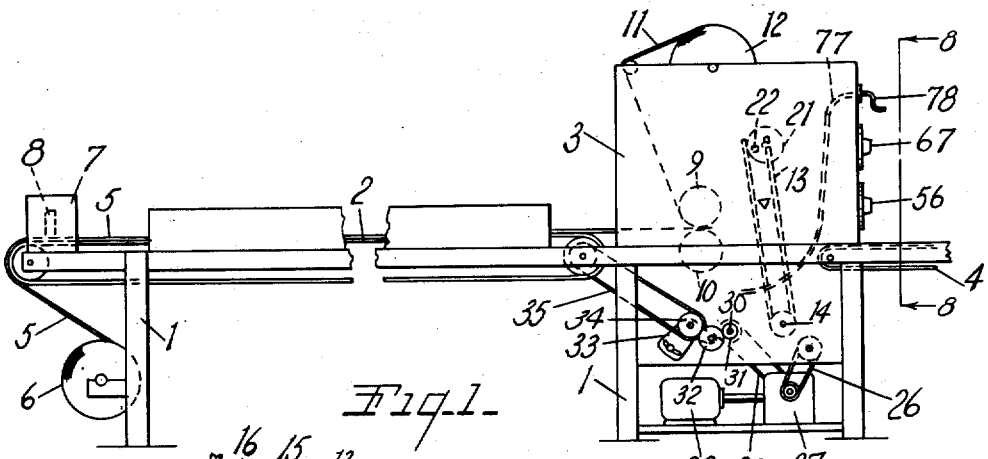
FIG. 1 is a fragmentary side elevational view of a pouch type packaging machine with the pouch length adjusting mechanism incorporated therein.
Figure 2:
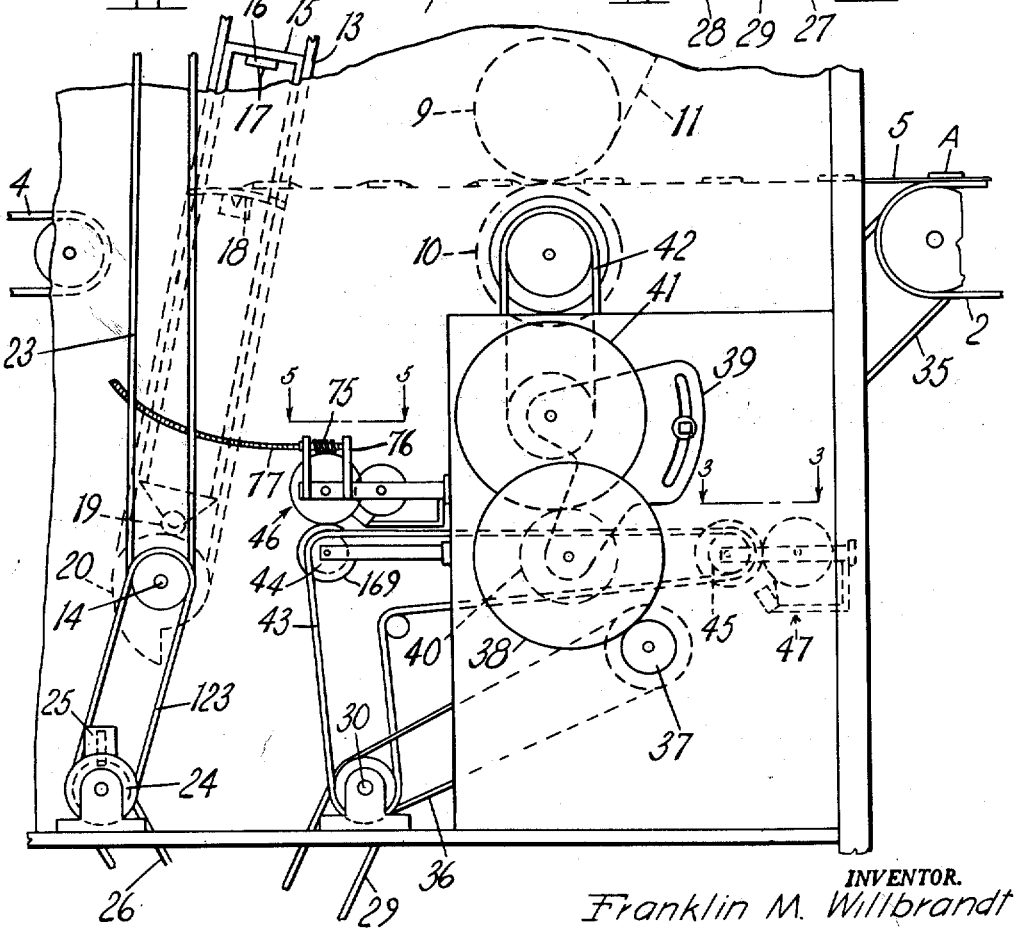
FIG. 2 is a fragmentary enlarged side elevational view of the opposite side of the packaging machine from FIG. 1 illustrating the driving connections to the several parts of the machine.

After the top and bottom packaging webs have been sealed together on opposite sides of the articles the web is advanced to the right as shown in FIG. 1 and to the left as shown in FIG. 2. In order to seal the two webs transversely between the articles A and if desired to sever the web into separate pouches, the web is advanced between parallel upright rocker arms 13 which are pivoted below the conveyors 2 and 4 on a cam shaft 14. The rocker arms form slides or guides ways for slide members 15 supporting a transverse sealing bar 16 and knife 17. The sealing bar and knife coact with an abutment 18 carried between the rocker arms in supporting relation to the sealed webs being delivered from the rollers 9 and 10. In their lower ends the slide members 15 carry cam followers 19 which are engaged and actuated by cams 20 on the cam shaft to raise and lower the sealing bar 16 and knife 17. The upper ends of the rocker arms 13 are oscillated forwardly and rearwardly by sprockets 21 having crank pins 22 engaging the rocker arms and the sprockets 21 are driven in timed relationship with the cam 20 by a chain 23 driven from the cam shaft 14 so that the slide and knife 17 descend when the rocker arm is advanced to the left in FIG. 2 to sever a newly formed pouch and retract upwardly as the support 18 retracts under the incoming web and articles.

In order to provide for a wide variety of timing adjustments between the speed of the feeding conveyor 2, the frequency of the actuation of the printer 7 and the frequency of the actuation of the slides 15 and the rocker arms 13, separate driving connections are provided to the cam shaft 14 and to the infeeding conveyor 2 and to the side sealing rolls 9 and 10. The cam shaft 14 is driven by a chain 123 from an electrically actuated one revolution clutch 24 having a control solenoid 25. The driven part of the one revolution clutch is continuously driven by a chain 26 from a speed reduction transmission 27 and motor 28 shown conventionally in FIG. 1.

The transmission 27 also drives a chain 29 driving a main drive shaft 30. On the side of the machine shown in FIG. 1 the shaft 30 drives a selectively interchangeable gear 31 engaged with a second selectively interchangeable gear 32 mounted on the crank plate 33. The gear 32 meshes with a gear 34 which drives the chain 35 to the infeeding conveyor 2. By selecting the desired gear ratio between the gears 31 and 32 and adjusting the crank plate 33 to mesh the gears, the speed of the infeeding conveyor 2 may be adjusted.

The shaft 30 also drives a chain 36 appearing in FIG. 2 to drive the selectively interchangeable gear 37 which meshes with a selectively interchangeable gear 38 carried on the crank plate 39. The gear 38 drives through a pinion 40 to the gear 41 and through a connected chain 42 to the lower sealing rolls 10. The speed of the side sealing rolls 9 and 10 can thus be adjusted to the same speed as the infeeding conveyor 2.

In order to provide additional adjustment of the speed of the side sealing rolls relative to the timing of the transverse sealing bar 16 and to variably actuate the printing device 7, the drive shaft 30 continuously drives a chain 43 trained over the sprocket 44 and the sprocked 45. The sprocket 44 drives a first selective switch operating transmission generally indicated at 46 in FIG. 2, and a second selective switch actuating transmission generally indicated at 47 *is driven by the sprocket 45*. The switch transmission 46 *constitutes a variable frequency switching device and* functions as will be described in greater detail presently to actuate the solenoid 25 of the one revolution clutch and initiates a sealing and severing cycle of the rocker arms 13 and sealing bar 16. The transmission 47 *constitutes a second and independently adjustable variable frequency switching device and* functions to actuate the solenoid 8 of the printer 7 at selectively timed intervals as will be described.

Figure 3:
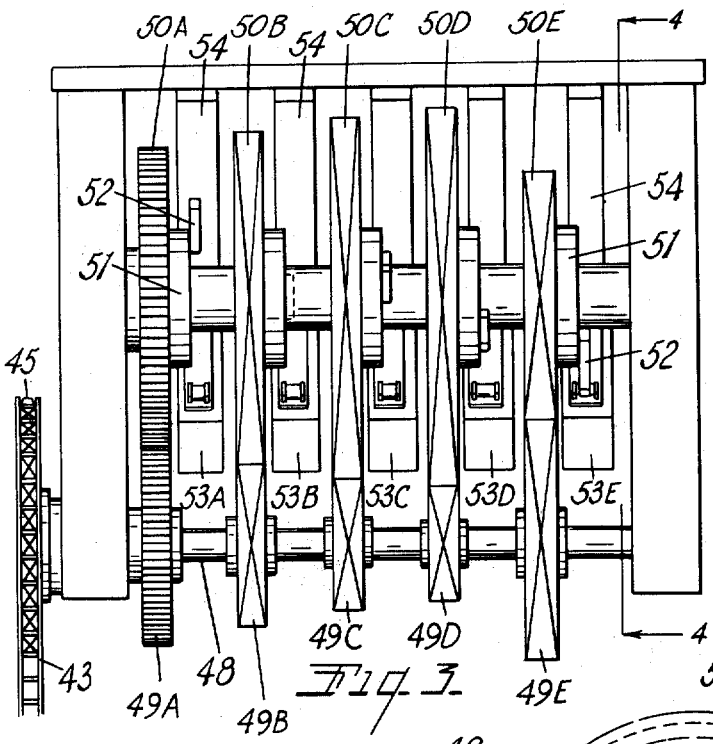
FIG. 3 is a fragmentary enlarged plan view of the pouch area printer control, the view being taken generally along the plane of the line 3—3 in FIG. 2.
Figure 4:
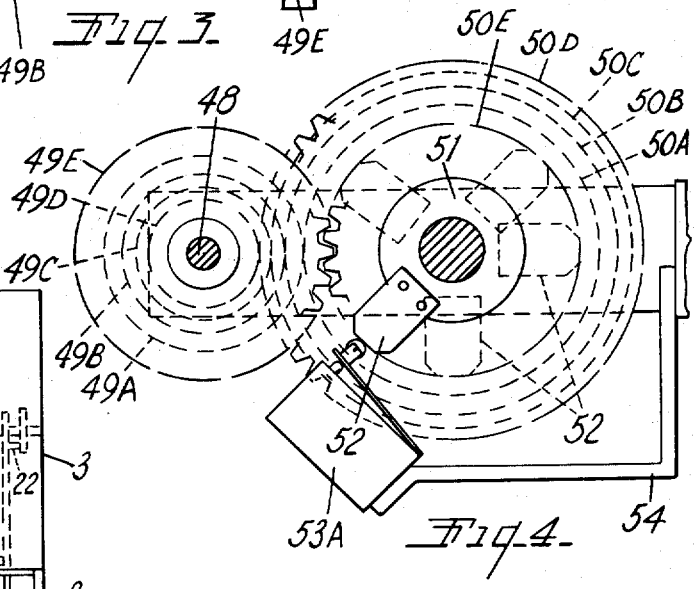
FIG. 4 is a fragmentary cross sectional view through the printer control taken along the plane of the line 4—4 in FIG. 3.
Figures 5, 6, 7:
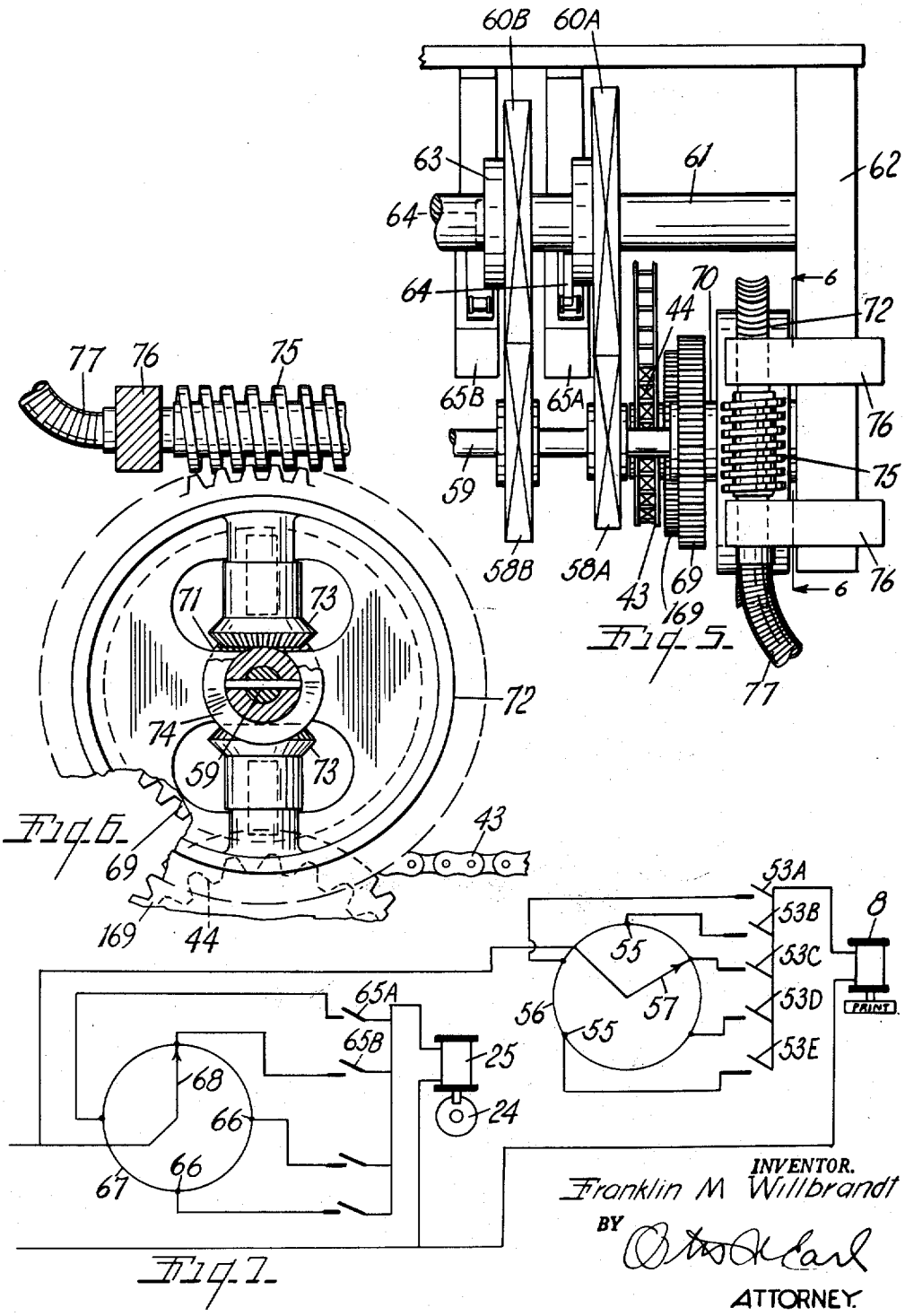
FIG. 5 is a fragmentary top plan view of the pouch forming control taken along the plane of the line 5—5 in FIG. 2.
FIG. 6 is a fragmentary vertical cross sectional view taken along the plane of the line 6—6 in FIG. 5 and illustrating the mechanism for advancing and retracting the time of actuation of the pouch forming mechanism relative to the pouch area marking mechanism.
FIG. 7 is a schematic wiring diagram of the electrical controls of the machine.

The printer actuating transmission and the electrical connections thereto is best illustrated in FIGS. 3, 4 and 7 which illustrate the chain 43 to be drivingly connected to a shaft 48 having a plurality of different sized gears 49A, 49B, 49C, 49D and 49E drivingly connected thereto. The gears 49 continuously mesh with mating gears 50A, 50B, 50C, 50D and 50E which necessarily vary in size inversely with the gears 49. The gears 49E and 50E are of equal size for a 1 to 1 driving ratio. Each of the gears 50A through E carry a disc 51 with a tappet 52 projecting therefrom and the several tappets 52 are arranged to trip and close electrical switches 53 mounted on supports 54 below and between the gears 49 and 50. As is shown most clearly in the circuit diagram of FIG. 7 the switches 53A through E are connected on one side in parallel to the solenoid 8 of the printer. On their other sides the switches 53 are connected separately to the terminals 55 of a selector switch 56 having an adjustable contact 57. By adjusting the switch 56 and its contact 57, the printer 7 may be actuated at different speeds or frequencies relative to the infeeding speed of the conveyor 2 and the bottom web 5. This will obviously create pouch areas of different lengths on the web 5 which can be made to correspond to the length of articles which it is desired to package.

The rocker arms 13 and transverse sealer and cutter 16–17 are actuated as previously described through one cycle of operation on each actuation of the solenoid 25 of the one revolution clutch 24. The solenoid 25 is selectively actuated by the transmission 46 driven concurrently with the transmission 47 by the sprocket 44. The transmission 46 is shown in detail in FIGS. 5 and 6 wherein a first series of gears 58A, 58B etc. are drivingly mounted on a shaft 59 and meshed with mating gears 60A, 60B etc. on the shaft 61. The shafts 59 and 61 are carried by suitable brackets 62 above the sprocket 44. The gears 60A, B etc. each carry a disc 63 having a pawl 64 thereon arranged to contact and close a switch 65A or B etc. As is shown in the wiring diagram FIG. 7 one side of the switches 65 are connected in parallel to the solenoid 25 while the other sides of the switches are connected separately to the selective terminals 66 of a selective switch 67 having a moveable contact 68. By adjusting the contact 68 the solenoid 25 and the transverse sealer and cutter actuated thereby can be made to operate at various frequencies relative to the actuation of the printer 7. For example, the transverse sealer can be set to operate between every printed indicia at the several different spacings available with the switch 56 or the transverse selector can be made to operate between every other printed indicia. This permits a wide range of adjustments of the pouch lengths created by the machine.

Without further structure the transverse sealer and cutter would operate at a given position on the web relative to the printed indicia due to the simultaneous and equal speed of the transmission 46 and 47. However, in order to permit adjustment of the cut-off position longitudinally of the web relative to the indicia marks a differential drive is provided between the chain 43 and the shaft 59. *This constitutes a phase relation adjustment between the first adjustable frequency switch device formed by the switch operating transmission 46 and the second adjustable frequency switching device formed by the switch operating transmission 47.* This differential drive shown in FIGS. 5 and 6 consists of a gear 69 driven by gear 169 which is connected to the coaxial sprocket 44 and chain 43. The gear 69 is connected by a sleeve 70 to a bevel gear 71 surrounding the shaft 59 and rotatable relative thereto. Positioned around the bevel gear 71 is a combined ring gear and carrier 72 having a pair of planetary gears 73 mounted on stub shafts perpendicular to the shaft 59. The bevel gears 73 mesh with the bevel gear 71 and also with a fourth bevel gear 74 pinned to the shaft 59.

By a well known differential action rotation of the gear 69 and bevel gear 71 is transmitted through the bevel gears 73 to the bevel 74 and shaft 59 at a fixed ratio so long as the ring gear and carrier 72 is held stationary. In order to introduce a differential drive and advance or retard the rotation of the shaft 59 relative to the chain 43 and the printer transmission, a worm gear 75 carried by brackets 76 is meshed with the ring gear 72 and connected by means of a flexible shaft 77 to a control crank 78 mounted on the side of the machine above the switches 56 and 67. The crank 78 may conveniently have a counter 79 associated therewith which registers the number of turns imparted to the worm 75 and indicates the extent to which the ring gear 72 has been advanced or retarded relative to the gear 69 and the printer transmission.

The printer transmission 47 and selector switch 56 and the sealer transmission 46 and selector switch 67 provide a wide range of possible adjustments of the pouch length formed by the machine. It will be appreciated that as many gears and switches may be provided in each transmission as is desired. In addition the number of possible pouch length adjustments can be further multiplied with each additional set of interchangeable gears 37–38 and 29–32 provided with the machine. In any selected position of pouch length adjustment the location of the transverse seal can be adjusted relative to the pouch area indicating indicia by manipulation of the crank 78. It is accordingly practical to use the same machine for packaging a wide variety of sizes of articles A as the pouch length can be quickly adjusted to accommodate one size of article after a number of a different size article have been packaged.

What is claimed as new is:

1. In a pouch type packaging machine having means for receiving articles on a continuously advanced web of wrapping material and forming a pouch package around the articles including means for transversely sealing and cutting the web after the sides of the pouch are sealed, adjustable means for indicating different pouch areas on said web and for actuating the means for sealing and severing the web between said pouch areas comprising a first drive including an interchangeable set of gears connected to advance and longitudinally seal the sides of said web at different speeds, a printer positioned to operate on the incoming web and having an electrically actuated control connected to operate the printer, a second drive including a one revolution clutch connected to actuate said transverse sealer and cutter, a printer actuating transmission including plural switches actuated at different frequencies and each connected to the control of said printer, a selector switch connected to selectively energize one of the switchse of said printer transmission to said printer control, a sealer and cutter actuating transmission driven in timed relationship to said printer transmission and including a plurality of switches actuated at different frequencies and connected to actuate said clutch, a second selector switch having a plurality of contacts connected to selectively energize said switches of said sealer transmission, a differential drive connected between said sealer transmission and said drive to said transmissions whereby the times of closing the switches in said sealer transmission may be advanced and retarded relative to the time of closing of the selected switch in said printer transmission, said differential connection including an adjusting crank operable from the exterior of the machine and having a visible counter dial recording the number of advancing and retracting rotations of the adjusting element of the differential connection.

2. In a pouch type packaging machine having means for receiving articles on a continuously advanced web of wrapping material and forming a pouch package around the articles including means for transversely sealing and cutting the web after the sides of the pouch are sealed, adjustable means for indicating different pouch areas on said web and for actuating the means for sealing and severing the web between said pouch areas comprising a first drive connected to advance and longitudinally seal said web, a printer positioned to operate on the incoming web and having an electrically actuated control connected to operate the printer, a second drive including a one revolution clutch connected to actuate said transverse sealer and cutter, a printer actuating transmission including plural switches actuated at different frequencies and each connected to the control of said printer, a selector switch connected to selectively energize one of the switches of said printer transmission to said printer control, a sealer and cutter actuating transmission driven in timed relationship to said printer transmission and including a plurality of switches actuated at different frequencies and connected to actuate said clutch, a second selector switch having a plurality of contacts connected to selectively energize said switches of said sealer transmission, a differential drive connected between said sealer transmission and said drive to said transmissions whereby the times of closing the switches in said sealer transmission may be advanced and retarded relative to the time of closing of the selected switch in said printer transmission, said differential connection including an adjusting crank operable from the exterior of the machine.

3. In a pouch type packaging machine having means for continuously advancing a web of wrapping material and forming a pouch package around articles placed on the web including means for transversely sealing and cutting the web after the sides of the pouch are sealed, adjustable means for indicating different pouch areas on said web and actuating the means for sealing and severing the web between said pouch areas comprising a first drive connected to advance and longitudinally seal said web at different speeds, a printer positioned to operate on the incoming web and having an electrically actuated control connected to operate the printer, a second intermittent drive including a one revolution clutch connected to actuate said transvers sealer and cutter, a printer actuating transmission including plural switches each connected to the control of said printer, a selector switch connected to selectively connect one of the switches of said printer transmission to said printer control, a sealer and cutter actuating transmission driven in timed relationship to said printer transmission and including a plurality of switches actuated at different frequencies and connected to actuate said clutch of said intermittent drive, a second selector switch having a plurality of contacts connected to selectively energize said switches of said sealer transmission, and a differential drive connected between said sealer transmission and said drive to said transmissions whereby the times of closing the switches in said sealer transmission may be advanced and retarded relative to the time of closing of the selected switch in said printer transmission.

4. In a pouch type packaging machine having means for continuously advancing a web of wrapping material and forming a pouch package around articles placed on the web including means for transversely sealing the web after the sides of the pouch are sealed, adjustable means for indicating different pouch areas on said web and actuating the means for sealing the web between said pouch areas comprising a first drive connected to advance said web, a printer positioned to operate on the incoming web and having an electrically actuated control connected to operate the printer, a second intermittent drive connected to actuate said transverse sealer, a printer actuating transmission including plural switches each connected to the control of said printer, a selector switch connected to selectively connect one of the switches of said printer transmission to said printer control, a sealer and cutter actuating transmission driven in timed relationship to said printer transmission and including a plurality of switches actuated at different frequencies and connected to actuate said intermittent drive, a second selector switch having a plurality of contacts connected to selectively energize said switches of said sealer transmission, and a differential drive connected between said drive to said printer transmission and said sealer transmission whereby the times of closing the switches in said sealer transmission may be advanced and retarded relative to the time of closing of the selected switch in said printer transmission.

5. In a pouch type packaging machine having means for continuously advancing a web of wrapping material and forming a pouch package around articles placed on the web including means for transversely sealing the web, adjustable means for indicating different pouch areas on said web and actuating the means for sealing the web between said pouch areas comprising a first drive connected to advance said web at different speeds, a printer positioned to operate on the incoming web and having an electrically actuated control connected to operate the printer, a second intermittent drive having an electrically controlled actuating element and connected to actuate said means for transversely sealing said web, a printer actuating transmission including plural switches each connected to the control of said printer, a selector switch selectively connectable in series with one of the switches of said printer transmission to render said one switch operative, a sealer actuating transmission driven in timed relationship to said printer transmission and including a plurality of switches actuated at different frequencies and connected to said actuating element of said intermittent drive, a second selector switch selectively connectable in series with one of the switches of said sealer transmission to render said one sealer transmission switch operative, and a differential drive connected between said drive to one of said transmissions and the transmission whereby the times of closing the switches of the one transmission may be advanced and retarded relative to the time of closing of the selected switch in the other transmission, said differential connection including a crank operable from the exterior of the machine.

6. In a pouch type packaging machine having means for continuously advancing a web of wrapping material and forming a pouch package around articles placed on the web including means for transversely sealing the web, adjustable means for indicating different pouch areas on said web and actuating the means for sealing the web between said pouch areas comprising a first drive connected to advance said web at different speeds, a printer positioned to operate on the incoming web and having an electrically actuated control connected to operate the printer, a second intermittent drive having an electrically controlled actuating element and connected to actuate said means for transversely sealing said web, a printer actuating transmission including plural switches each connected to the control of said printer, a selector switch selectively connectable in series with one of the switches of said printer transmission to render said one switch operative, a sealer actuating transmission driven in timed relationship to said printer transmission and including a plurality of switches actuated at different frequencies and connected to said actuating element of said intermittent drive, a second selector switch selectively connectable in series with one of the switches of said sealer transmission to render said one sealer transmission switch operative, and a differential drive connected between said drive to one of said transmissions and the transmission whereby the times of closing the switches of the one transmission may be advanced and retarded relative to the time of closing of the selected switch in the other transmission.

7. A pouch packaging machine comprising means for advancing a web of wrapping material over a loading conveyor and forming a pouch over articles placed on the web, means for transversely sealing said pouch, electrically actuated marking means positioned to mark pouch area indicating marks on said web at the beginning of said conveyor, a first transmission having a plurality of switches actuated at different frequencies by operation of the transmission, a first selector switch connected to selectively render one of said transmission switches effective to actuate said marking means, a second electrically actuated means for actuating said transverse sealing means, a second transmission having a plurality of switches actuated at different frequencies by operation of the transmission, a second selector switch connected to selectively render one of the switches of said second transmission effective to actuate second electrically actuated means, and means connected to drive said transmission simultaneously in timed relation with said conveyor, there being a differential drive connection with a manually operable control interposed between one of said transmissions and said last drive means to advance and retract the rotation of said transmissions relative to each other.

8. A pouch packaging machine comprising means for advancing a web of wrapping material over a loading conveyor and forming a pouch over articles placed on the web, means for transversely sealing said pouch, electrically actuated marking means positioned to mark pouch area indicating marks on said web at the beginning of said conveyor, a first transmission having a plurality of switches actuated at different frequencies by operation of the transmission, a first selector switch connected to selectively render one of said transmission switches effective to actuate said marking means, a second electrically actuated means for actuating said transverse sealing means, a second transmission having a plurality of switches actuated at different frequencies by operation of the transmission, a second selector switch connected to selectively render one of the switches of said second transmission effective to actuate second electrically actuated means, and means connected to drive said transmissions simultaneously in timed relation with said conveyor, there being a differential drive connection interposed between one of said transmissions and said last drive means to advance and retract the rotation of said transmissions relative to each other.

9. A pouch packaging machine comprising means for advancing a web of wrapping material over a loading conveyor and forming a pouch over articles placed on the web, means for transversely sealing said pouch, electrically actuated marking means positioned to mark pouch area indicating marks on said web at the beginning of said conveyor, a first transmission having a plurality of switches actuated at different frequencies by operation of the transmission, a first selector switch connected to selectively render one of said transmission switches effective to actuate said marking means, a second electrically actuated means for actuating said transverse sealing means, a second transmission having a plurality of switches actuated at different frequencies by operation of the transmission, a second selector switch connected to selectively render one of the switches of said second transmission effective to actuate second electrically actuated means, and means connected to drive said transmissions simultaneously in timed relation with said conveyor.

*10. In a pouch type packaging machine having means for receiving articles on a continuously advanced web of wrapping material and means for forming pouch packages*

*including said web around the articles and means for transversely sealing and cutting the web after the packages have been formed,*

*adjustable means for indicating different length pouch areas on said web and for actuating the means for forming the packages and cutting the web comprising,*

*means connected to drive said package forming means and to advance said web in timed relation,*

*a printer positioned to operate on the incoming web adjacent the infeeding end thereof and having an electrically actuated control connected to operate the printer,*

*means including a one revolution clutch connected to drive said means for transversely sealing the web,*

*a second electrically actuated control connected to engage said clutch,*

*a first variable frequency switching device connected to said electrically actuated control for operating said printer,*

*a second variable frequency switching device connected to activate said second electrically actuated control,*

*and means connected to simultaneously advance said first and second variable frequency devices at equal increments of their switching frequencies,*

*said means for advancing said variable frequency devices including a differential drive to one of said variable frequency switching devices to change the phase relation of advance of said devices.*

*11. In a pouch type packaging machine having means for receiving articles on a continuously advanced web of wrapping material and means for forming pouch packages including said web around the articles and means for transversely sealing the web after the packages have been formed,*

*adjustable means for indicating different length pouch areas on said web and for actuating the means for forming the packages comprising,*

*means connected to drive said package forming means and to advance said web in timed relation,*

*a printer positioned to operate on the incoming web adjacent the infeeding end thereof and having an electrically actuated control connected to operate the printer,*

*means including a one revolution clutch connected to drive said means for transversely sealing the web,*

*a second electrically actuated control connected to engage said clutch,*

*a first variable frequency switching device connected to said electrically actuated control for operating said printer,*

*a second variable frequency switching device connected to activate said second electrically actuated control,*

*and means connected to simultaneously advance said first and second variable frequency devices at equal increments of their switching frequencies.*

*12. In a pouch packaging machine having means for delivering a web of pouch forming material and pouch sealing means acting on the web to transversely seal the web into pouches at intervals,*

*a pouch area marker positioned to operate on the web at the infeeding end thereof and having an eletcrical control connected to actuate the marker,*

*a second electrical control connected to actuate the pouch sealing means,*

*and a pair of variable frequency switching devices each driven concurrently in timed relation to said means for delivering said web and each connected to activate one of said controls at separately selected intervals,*

*one of said switching devices being adjustably connected to said means for delivering the web to vary the phase relation between said switching devices.*

*13. In a pouch packaging machine having means for delivering a web of pouch forming material and pouch sealing means acting on the web to transversely seal the web into pouches at intervals,*

*a pouch area marker positioned to operate on the web at the infeeding end thereof and having an electrical control connected to actuate the marker,*

*a second electrical control connected to actuate the pouch sealing means,*

*and a pair of variable frequency switching devices each driven concurrently in timed relation to said means for delivering said web and each connected to activate one of said controls at separately selected intervals.*

References Cited by the Examiner

The following references, cited by the Examiner are of record in the patented file of this patent or the original patent.

UNITED STATES PATENTS

| | | |
|---|---|---|
| 2,578,799 | 12/51 | Grey. |
| 2,611,225 | 9/52 | Williams. |
| 2,871,639 | 2/59 | Forgo. |
| 2,996,860 | 8/61 | Willbrandt. |

FRANK E. BAILEY, *Primary Examiner.*